June 26, 1934.  D. B. BAKER  1,964,495
TRACK FRAME MOUNTING FOR TRACKLAYING TRACTORS
Filed May 14, 1932   2 Sheets-Sheet 1
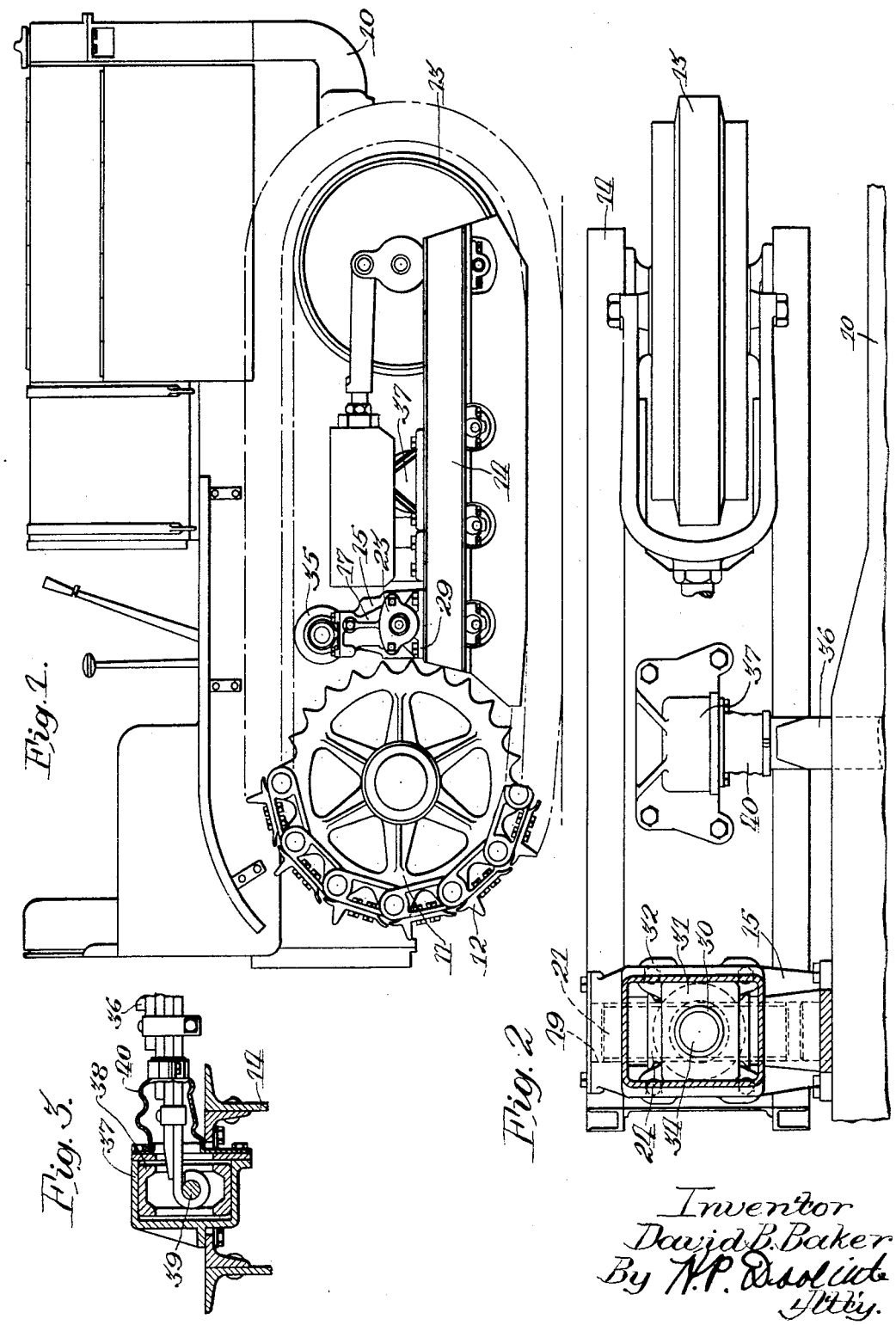

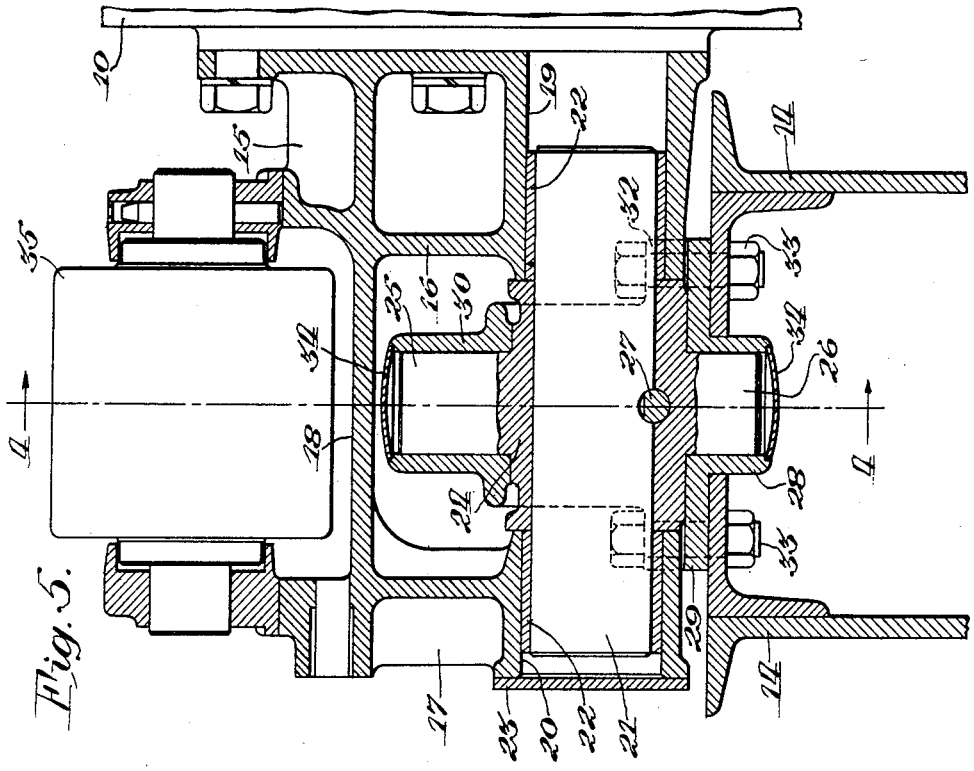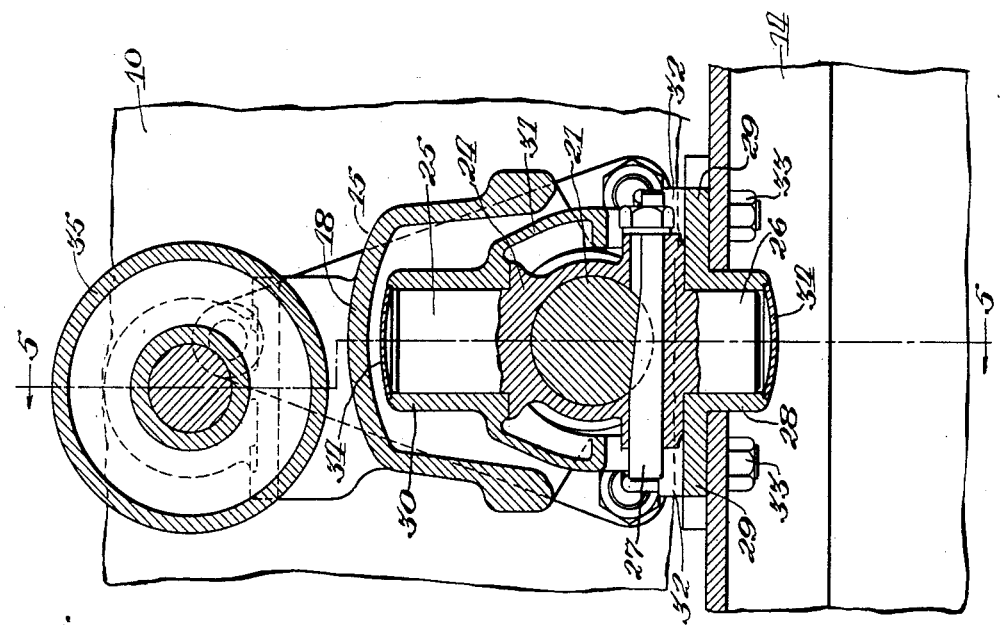

Patented June 26, 1934

1,964,495

UNITED STATES PATENT OFFICE 1,964,495

TRACK FRAME MOUNTING FOR TRACK-LAYING TRACTORS

David B. Baker, Riverside, Ill., assignor to International Harvester Company, a corporation of New Jersey Application May 14, 1932, Serial No. 611,275

7 Claims. (Cl. 305—9)

This invention relates to track laying tractors. More particularly it relates to track frame mountings for tractors of the track laying type.

The principal object of the invention is to provide a track laying tractor having track frames pivotally mounted at the sides thereof on a transverse axis, and pivotal connections which will also permit the track frames to oscillate within the limits desired about vertical axes. Another object is to provide a compact unitary pivot connection between the track frame and the tractor which will provide for the pivotal actions about transverse and vertical axes. Other more specific objects will be apparent in the detailed description to follow.

In the drawings:

Figure 1 is a side elevation showing a conventional type of track laying tractor, portions of which are broken away to show the construction which embodies the invention;

Figure 2 is a plan view of a track frame at one side of the tractor. A portion of the main frame of the tractor is shown and a portion of the connection between the track frame and the main frame is broken away in section to show the construction;

Figure 3 is a transverse section showing the connection of the transverse front support with the track frame;

Figure 4 is a section taken on the line 4—4 of Figure 5. The complete track frame is not shown in this figure, it being broken away, as only the pivotal connection need be illustrated; and, Figure 5 is a section taken on the line 5—5 of Figure 4.

The tractor shown is of the type having a one-piece main frame 10, which carries the engine and the driving mechanism of the tractor. The tractor frame and the parts carried thereby may be considered as the tractor body to differentiate from the complete tractor with the movable track frame and the other associated parts. Said body will be referred to as the main frame, as is conventional practice in this art. At the rear of the main frame sprocket wheels 11 are mounted at each side thereof and are operated by the driving mechanism of the tractor. Track chains 12 extend around the sprockets 11 and around idlers 13, which are rotatably mounted on transverse axes at the forward ends of the track frames 14. The general construction of the tractor, including the driving means, the track frames, and the tracks, is substantially the same as shown in United States Patent No. 1,503,615. The track frames are, however, mounted on the main frame by novel connecting means which form the basis of this invention.

As the construction at each side of the tractor is the same, only one side will be described. A bracket 15, rigidly mounted on the main frame 10 of the tractor, extends laterally therefrom. Said bracket is formed with spaced vertical webs 16 and 17, joined by a horizontal web 18. It is to be understood that these webs are connected to strengthen the bracket. In effect the webs 16, 17 and 18 and the connecting webs and bracing ridges form a housing. Adjacent the tractor, a transverse bore 19 is formed in the bracket 15. In axial alignment with said bore, a bore 20 of the same diameter is formed in an outer portion of the bracket supported by the web 17. A pin or shaft 21, mounted in bearing bushings 22, is rotatably mounted in the bores 19 and 20. A cover plate 23 at the outer end of the bore 20 forms a substantially oil-tight compartment in which the pin 21 is mounted. The inner end of the bore 19 is also closed where it abuts with the surface formed on the main frame 10.

A connecting member 24, carrying integral therewith diametrically positioned, axially aligned trunnions 25 and 26, is mounted on the pin 21 with the axis of the trunnions at right angles to the axis of the pin and extending vertically with respect thereto. The member 24 is provided with flanges at each end, which abut against the adjacent portions of the bracket 15. The member 24 is secured against rotation with respect to the pin 21 by a tapered key 27 which extends through an opening formed in the member 24 transversely to the axis of the pin 21. A slot, cut in the pin 21, is engaged by the tapered portion of the key 27. A nut is threaded on one end of said key to hold it in position and to thereby hold the connecting member 24 against rotation with respect to the pin 21.

The track frame 14 is mounted on the connecting member 24 for rotation about a vertical axis on the trunnions 25 and 26. A lower bearing member 28 having lateral horizontal extensions 29, is mounted on the track frame with a cylindrical trunnion engaging portion extending vertically downwardly through the top plate of the track frame. An upper bearing member 30 has a cylindrical portion which engages the upper trunnion 25 and outwardly and downwardly extending side portions 31. Said portions clear the sides of the connecting member 24 a sufficient distance to permit the necessary angular movement of the bearing member with respect thereto. The side portions 31 are also provided with openings to clear the ends of the key 27 and to permit access thereto. Said side portions are provided with laterally extending horizontal flanges 32 which mate with the flanges 29 on the lower bearing member. Bolts 33 extend through aligned openings in said flanges and in the top plate of the track frame 14, whereby the bearing members are rigidly secured in position with respect to each other and to the track frame. Welch plugs 34 close the ends of the cylindrical portions of the bearing members to form oil-tight compartments above and below the trunnions 25 and 26.

An idler roller 35 is shown, mounted at the upper side of the bracket 15. This roller is one of several used to support the upper run of the track chain. As the front support for the tractor, a transverse spring 36 is shown, the ends of which are mounted on the track frames 14. The particular connection used is illustrated in Figure 3. A housing 37 mounted on the track frame is provided with a cylindrical interior chamber on a transverse axis. A member 38, which might be considered as a piston, operates in the cylindrical chamber with a transverse movement limited by the end walls of the housing. The spring 36 is pivoted on a horizontal longitudinal axis on a pin 39 mounted in the member 38. The spring extends through the side of the housing 37 adjacent the tractor. A flexible shield 40, connected to the housing and to the adjacent end of the spring, seals the housing against the entrance of dirt while permitting the relative movement of said elements.

The particular construction between the cross spring and the track frames, as shown in Figure 3, is not a part of the present invention, being disclosed and claimed in the co-pending application, Serial No. 578,429, filed December 2, 1931. It is to be understood that any suitable connection could be used for the front support on the track frames which would permit the necessary relative movements.

In the normal operation of the track laying tractor, as disclosed, the track frames move up and down differentially; that is, one moves up when the other moves down. This action is taken care of by the so-called three-point suspension utilized in practically all tractors of this type. The transverse front support is usually pivoted to the main frame of the tractor on a longitudinal axis. As the transverse front support, in the drawings designated by the numeral "36", oscillates, the track frames 40 must move inwardly toward the tractor unless provision is made at the outer ends of the front support for lateral movement of the track frames with respect to the ends of said support. As shown in Figure 3, provision is made for such movement. This construction, however, leaves the track frame free at the front end to move laterally or, as commonly expressed, to wobble. To overcome this action, stabilizing means have been employed to hold the front of the track frames against lateral movement and to assure their oscillating movement between two vertical longitudinal planes. However, a limited amount of lateral movement of the track frames would not be objectionable, if it were not for the strain put upon the pivot axis of the track frames with the main frame. It is to overcome this objection, and to avoid the use of stabilizing means at the front of the track frames, that the present construction has been devised. As will be clearly understood from the preceding description, the track frames 14 are free to oscillate on a transverse axis about the pins 21. Each track frame is also free to oscillate about a vertical axis on the trunnions 25 and 26. The bracket 15 and the connecting members 29 and 30 are formed to permit the maximum angular movement without engagement of any of the parts which move relatively with respect to each other. By this construction, the front of the track frames are free to move within the limits governed by the cross support 36 and its connections with the track frames without any strain whatsoever at the rear connections of the track frames with the main frame of the tractor.

It is to be understood that applicant has shown and described a preferred embodiment of his improved track frame connections for track laying tractors and that he claims as his invention all modifications falling within the scope of the appended claims.

What is claimed is:

1. In a track laying tractor, a main frame, track frames positioned laterally of the main frame, means for pivotally connecting each track frame at the rear end thereof to the main frame for angular movement with respect thereto about transverse horizontal and vertical axes, and means for supporting the main frame on the track frames forwardly of said connecting means, said last named means including means for limiting lateral movement of the track frames with respect to the main frame.

2. In a track laying tractor, a main frame, track frames pivotally connected at their rear ends to the main frame for angular movement with respect thereto about transverse horizontal and vertical axes, and means for supporting the main frame on the track frames forwardly of the pivotal connection, said means including means to hold the track frames against appreciable lateral movement with respect to the main frame.

3. In a track laying tractor, a main frame, track frames pivotally connected at their rear ends to the main frame for limited angular movement with respect thereto about vertical axes and for angular movement with respect thereto on transverse axes, and a transverse front support extending under the main frame and pivotally connected to the track frames.

4. In a track laying tractor, a main frame, track frames positioned laterally of the main frame, pivotal connections between the rear of each track frame and the main frame including a connecting member pivoted to the track frame on a substantially vertical axis and pivoted to the main frame on a transverse horizontal axis, and a transverse front support connected to the main frame and to the track frames.

5. In a track laying tractor having a main frame and track frames positioned laterally of the main frame, a connection between each track frame and main frame including a bracket mounted on the main frame, a connecting member pivotally mounted on said bracket on a transverse axis, means for pivotally connecting the track frame to the connecting member on a vertical axis, and a transverse front support connected to the main frame and to the track frames.

6. In a track laying tractor, a main frame, track frames positioned laterally of the main frame, a bracket mounted on the main frame adjacent the rear end of each track frame, a connecting member rotatably mounted on a transverse axis on said bracket, a bearing member rigidly mounted on the track frame and pivotally secured to the connecting member for angular movement with respect thereto on a substantially vertical axis, and a transverse front support connected to the main frame and to the track frames.

7. In a track laying tractor, a main frame, track frames positioned laterally of the main frame, a bracket mounted on the main frame adjacent the rear end of each track frame, a connecting member rotatably mounted on a transverse axis on said bracket, and a bearing member rigidly mounted on the track frame and pivotally secured to the connecting member for angular movement with respect thereto on a substantially vertical axis, and a transverse front support for the main frame, said support being pivotally connected to the track frames on longitudinal axes whereby the track frames may differentially rise and fall.

DAVID B. BAKER.